United States Patent Office 3,418,319
Patented Dec. 24, 1968

3,418,319
CERTAIN 2-METHYL-3-PHENYL-(4)3H-
QUINAZOLONES
Alex Heusner and Karl Zeile, Ingelheim am Rhine, Germany, assignors to Boehringer Ingelheim G.m.b.H., Ingelheim am Rhine, Germany, a corporation of Germany
No Drawing. Continuation of application Ser. No. 431,166, Feb. 8, 1965. This application May 1, 1967, Ser. No. 635,263
Claims priority, application Germany, Feb. 21, 1964, B 75,539
5 Claims. (Cl. 260—256.4)

ABSTRACT OF THE DISCLOSURE

Novel 2-methyl-3-phenyl-3H-4-quinazolones and acid addition salts thereof, having sedative and anticonvulsonic properties, as well as to various methods of preparing these compounds are disclosed.

---

This is a continuation of application Ser. No. 431,166, filed Feb. 8, 1965, and now abandoned.

More particularly, the present invention relates to 2-methyl-3-(amino-phenyl)-3H-4-quinazolones of the formula

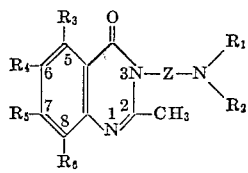

(I)

wherein $R_1$ and $R_2$ are each selected from the group consisting of hydrogen and alkyl of 1 to 3 carbon atoms,
$R_3$, $R_4$, $R_5$ and $R_6$ are each selected from the group consisting of hydrogen, halogen, alkyl of 1 to 3 carbon atoms and alkoxy of 1 to 3 carbon atoms, provided, however, that at least one of them is other than hydrogen, and
Z is phenylene which may have one or more alkyl and/or alkoxy substituents of 1 to 3 carbon atoms attached thereto, and their non-toxic, pharmacologically acceptable acid addition salts.

The compounds according to the present invention may be prepared by various methods, among which the following have proved to be most convenient and efficient.

Method A

By reduction of a 2-methyl-3-phenyl-3H-4-quinazolone of the formula

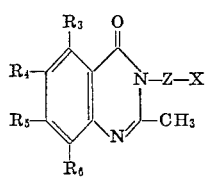

(II)

wherein $R_3$ through $R_6$ and Z have the same meanings as in Formula I and X is selected from the group consisting of nitro and nitroso, with catalytically activated hydrogen or nascent hydrogen.

Method B

By removal of the protective group from a 2-methyl-3-phenyl-3H-4-quinazolone of the formula

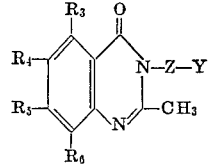

(III)

wherein $R_3$ through $R_6$ and Z have the same meanings as in Formula I and Y is a reversibly protected amino group, by hydrolysis or hydrogenation. Examples of suitable protective groups for the amino group are alkanoyl, benzyloxycarbonyl and benzyl. In principle, however, the acyl radical of any desired aliphatic, araliphatic or aromatic acid may be used as the protective group for the amino moiety. Particularly preferred are those acids whose acyl radical may be readily split off, such as formic acid, acetic acid, propionic acid, p-toluene sulfonic acid or benzoic acid. The hydrolysis may be carried out in an acid or alkaline medium. The removal of the benzyloxy carbonyl or benzyl protective group is preferably effected by hydrogenation.

Method C

By condensing an acetylanthranilic acid of the formula

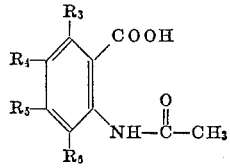

(IV)

wherein $R_3$ through $R_6$ have the same meanings as in Formula I, with a phenylenediamine of the formula

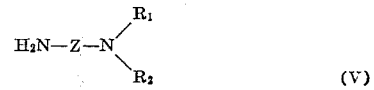

(V)

wherein $R_1$, $R_2$ and Z have the same meanings as in Formula I, in the presence of a dehydrating agent, phosphorus oxy-chloride, phosphorus trichloride, carbodiimides or benzenesulfonyl chloride.

Method D

By heating an acetylanthranil compound of the formula

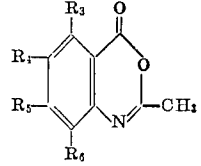

(VI)

wherein $R_3$ through $R_6$ have the same meanings as in Formula I, with a phenylenediamine of the Formula V in the presence or absence of an inert organic solvent.

In the event that the end product of Methods A through D above is a compound of the Formula I wherein $R_1$ and $R_2$ are both hydrogen, this end product may, if desired, be converted into a corresponding monoalkyl- or dialkylamino compound by reacting the aminophenyl compound with an alkylating agent, such as an alkylhalide, for example, methyliodide, or a mono- or dialkylsulfate. The alkylating reaction is preferably carried out at elevated temperatures and in the presence of an inert solvent.

A compound of the Formula I may be converted by customary methods into non-toxic, pharmacologically acceptable acid addition salts with an inorganic or organic

EXAMPLE 7

Preparation of 2-methyl-3-(o-aminophenyl)-7-chloro-3H-4-quinazolone by Method C 3.9 gm. (0.02 mol) of 4-chloro-acetylanthranil and 2.16 gm. (0.02 mol) of o-phenylenediamine were intimately admixed with each other. The mixture was then heated on an oil bath until the melting point was reached and was allowed to remain at that temperature until the evolution of gas ceased. The reaction mixture was then allowed to cool, and the solidified mixture was recrystallized from a mixture of ethanol and water. The product, having a melting point of 132–134° C., was identified to be the same as that obtained in Example 1. The yield was 60% of theory.

EXAMPLE 8

Preperation of 2,6-dimethyl-3-[p-(dimethyl-amino)-phenyl]-3H-4-quinazolone by Method C A suspension of 9.65 gm. of 5-methyl-acetyl-anthranilic acid and 6.81 gm. of p-amino-dimethylaniline in 80 cc. of toluene was admixed dropwise with a solution of 8.05 gm. of phosphorus oxychloride in 10 cc. of toluene, and the mixture was then refluxed for thirty minutes while stirring. Thereafter, the reaction solution was allowed to cool. The precipitate formed thereby was separated by vacuum filtered and introduced into 100 cc. of concentrated ammonia, whereby a precipitate formed which was separated and recrystallized from a mixture of ethanol and water. 4.48 gm. of a compound having a melting point of 229–231° C. were obtained. It was identified to be 2,6-dimethyl-3-[p-(dimethyl - amino)-phenyl]-3H-4-quinazolone of the formula

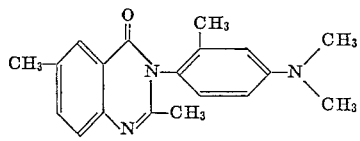

EXAMPLE 9

Preparation of 2-methyl-3-(o-aminophenyl)-7-chloro-3H-4-quinazolone by Method B 5 gm. of 2-methyl-3-(o-acetaminophenyl)-7-chloro-3H-4-quinazolone were admixed with 100 cc. of concentrated hydrochloric acid, and the mixture was heated for two hours on a boiling water bath; all of the solid matter went into solution after a short period of time. The reaction solution was then allowed to cool, the minor amount of crystalline precipitate formed thereby was separated by filtration, and the filtrate was made alkaline with ammonia. The precipitate formed thereby was separated by vacuum filtration and recrystallized from a mixture of ethanol and water 3.0 gm. of a compound having a melting point of 130–132° C. were obtained. The product did not depress the melting point of a sample of the end product of Example 1, and infrared spectrum analysis confirmed that the product was identical with that obtained in Example 1.

The starting compound, 2-methyl-3-(o-acetaminophenyl)-7-chloro-3H-4-quinazolone, M.P. 195–197° C., may be prepared by reacting 4-chloro-acetylanthranil with o-amino-acetanilide or by condensing 4-chloro-acetylanthranilic acid with o-amino-acetanilide in the presence of a dehydrating agent.

EXAMPLE 10

Using a procedure analogous to that described in Example 7, 2-methyl - 3-(o-aminophenyl)-8 - chloro - 3H-4-quinazolone, M.P. 170–172° C., was prepared from 3-chloro-acetylanthranil and o-phenylenediamine.

EXAMPLE 11

Using a procedure analogous to that described in Example 1, 2-methyl-3-(o-methoxy - p - aminophenyl)-8-chloro-3H-4-quinazolone, M.P. 236–238° C., of the formula

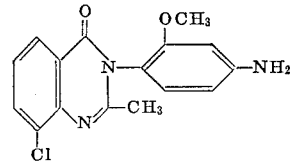

was prepared by catalytic hydrogenation of 2-methyl-3-(o-methoxy-p-nitro-phenyl)-8-chloro-3H-4-quinazolone.

EXAMPLE 12

Using a procedure analogous to that described in Example 1, 2-methyl-3-(o-methoxy-m'-amino-phenyl)-8-chloro-3H-4-quinazolone, M.P. 201–202° C. of the formula

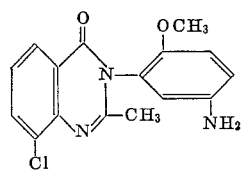

was prepared by catalytic hydrogenation of 2-methyl-3-(o-methoxy-p-nitro-phenyl)-8-chloro-3H-4-quinazolone.

EXAMPLE 13

Using a procedure analogous to that described in Example 1, 2-methyl-3-(o-methyl - p - amino - phenyl)-7-chloro-3H-4-quinazolone semihydrate, M.P. 144–146° C., was prepared by catalytic hydrogenation of 2-methyl-3-(o-methyl-p-nitro-phenyl)-7-chloro-3H-4-quinazolone.

EXAMPLE 14

Using a procedure analogous to that described in Example 1, 2-methyl-3-(o-methoxy - p - amino-phenyl)-7-chloro-3H-4-quinazolone, M.P. 215–217° C., was prepared by catalytic hydrogenation of 2-methyl-3-(o-methoxy-p-nitro-phenyl)-7-chloro-3H-4-quinazolone.

EXAMPLE 15

Using a procedure analogous to that described in Example 7, 2-methyl-3-(o-aminophenyl)-6-chloro-3H-4-quinazolone, M.P. 222–224° C., of the formula

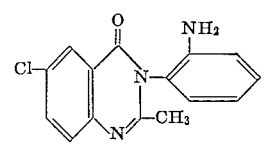

was prepared from 5-chloroacetylanthranil and o-phenylene diamine.

EXAMPLE 16

Using a procedure analogous to that described in Example 1, 2-methyl-3-(o-methyl - p - amino - phenyl)-6-chloro-3H-4-quinazolone, M.P. 254–256° C., was prepared by catalytic hydrogenation of 2-methyl-3-(o-methly-p-nitro-phenyl)-6-chloro-3H-4-quianazolone.

EXAMPLE 17

Using a procedure analogous to that described in Example 1, 2-methyl-3-(o-methoxy - p - amino-phenyl)-6-chloro-3H-4-quinazolone, M.P. 244–245° C., was prepared by catalytic hydrogenation of 2-methyl-3-(o-methoxy-p-nitro-phenyl)-6-chloro-3H-4-quinazolone.

EXAMPLE 18

Using a procedure analogous to that described in Example 1, 2 - methyl - 3-(o-methoxy-m'-amino-phenyl)-6-chloro-3H-4-quinazolone, M.P. 226–228° C., was prepared by catalytic hydrogenation of 2-methyl-3-(o-methoxy-m'-nitro-phenyl)-6-chloro-3H-4-quinazolone.

EXAMPLE 19

Using a procedure analogous to that described in Example 9, 2 - methyl - 3-(o-aminophenyl)-5-chloro-3H-4-quinazolone, M.P. 192–193° C., of the formula

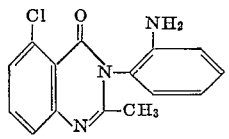

was prepared by acid hydrolysis of 2-methyl-3-(o-acetaminophenyl)-5-chloro-3H-4-quinazolone.

EXAMPLE 20

Using a procedure analogous to that described in Example 1, 2-methyl-3-(o-methyl-p-aminophenyl)-5-chloro-3H-4-quinazolone semihydrate, M.P. 127–129° C., was prepared by catalytic hydrogenation of 2-methyl-3-(o-methyl-p-nitro-phenyl)-5-chloro-3H-4-quinazolone.

EXAMPLE 21

Using a procedure analogous to that described in Example 1, 2-methyl-3-(o-methoxy-p-amino-phenyl)-5-chloro-3H-4-quinazolone, M.P. 197–198° C., was prepared by catalytic hydrogenation of 2-methyl-3-(o-methoxy-p-nitro-phenyl)-5-chloro-3H-4-quinazolone.

EXAMPLE 22

Using a procedure analogous to that described in Example 1, 2 - methyl - 3-(o-methoxy-m'-amino-phenyl)-5-chloro-3H-4-quinazolone, M.P. 213–215° C., was prepared by catalytic hydrogenation of 2-methyl-3-(o-methoxy-m'-nitro-phenyl)-5-chloro-3H-4-quinazolone.

EXAMPLE 23

Using a procedure analogous to that described in Example 1, 2 - methyl-3-(o-methyl-p-amino-phenyl)-6,8-dichloro-3H-4-quinazolone, M.P. 258–260° C., of the formula

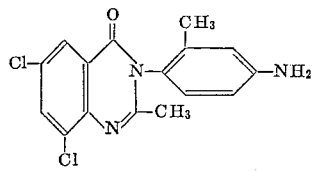

was prepared by catalytic hydrogenation of 2-methyl-3-(o-methyl-p-nitro-phenyl)-6,8-dichloro-3H-4-quinazolone.

EXAMPLE 24

Using a procedure analogous to that described in Example 1, 2-methyl-3-(o-methyl-p-amino-phenyl)-6-bromo-3H-4-quinazolone, M.P. 239–241° C., of the formula

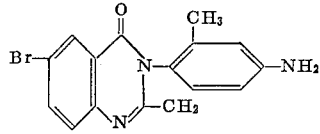

was prepared by catalytic hydrogenation of 2-methyl-3-(o-methyl-p-nitro-phenyl)-6-bromo-3H-4-quinazolone.

EXAMPLE 25

Using a procedure analogous to that described in Example 1, 2,6-dimethyl-3-(o-aminophenyl)-3H-4-quinazolone, M.P. 162–163° C., of the formula

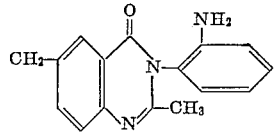

was prepared by catalytic hydrogenation of 2,6-dimethyl-3-(o-nitrophenyl)-3H-4-quinazolone.

EXAMPLE 26

Using a procedure analogous to that described in Example 1, 2,6-dimethyl-3-(p-aminophenyl)-3H-4-quinazolone, M.P. 197–199° C., was prepared by catalytic hydrogenation of 2,6-dimethyl-3-(p-nitrophenyl)-3H-4-quinazolone.

EXAMPLE 27

Using a procedure analogous to that described in Example 1, 2,6-dimethyl-3-(o-methyl-p-amino-phenyl)-3H-4-quinazolone, M.P. 199–200° C., was prepared by catalytic hydrogenation of 2,6-dimethyl-3-(o-methyl-p-nitro-phenyl)-3H-4-quinazolone.

EXAMPLE 28

Using a procedure analogous to that described in Example 1, 2,6-dimethyl-3-(o-methoxy-p-amino-phenyl)-3H-4-quinazolone, M.P. 230–232° C., was prepared by catalytic hydrogenation of 2,6-dimethyl-3-(o-methoxy-p-nitro-phenyl)-3H-4-quinazolone.

EXAMPLE 29

Using a procedure analogous to that described in Example 1, 2,6-dimethyl-3-(o-methoxy-m'-amino-phenyl)-3H-4-quinazolone, M.P. 237–239° C., was prepared by catalytic hydrogenation of 2,6-dimethyl-3-(o-methoxy-m'-nitro-phenyl)-3H-4-quinazolone.

EXAMPLE 30

Using a procedure analogous to that described in Example 1, 2,7-dimethyl-3-(p-aminophenyl)-3H-4-quinazolone, M.P. 228–230° C., of the formula

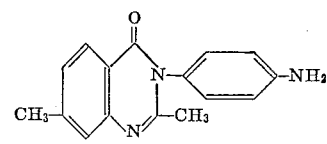

was prepared by catalytic hydrogenation of 2,7-dimethyl-3-(p-nitrophenyl)-3H-4-quinazolone.

EXAMPLE 31

Using a procedure analogous to that described in Example 1, 2,7-dimethyl-3-(o-methyl-p-amino-phenyl)-3H-4-quinazolone, M.P. 170–172° C., was prepared by catalytic hydrogenation of 2,7-dimethyl-3-(o-methyl-p-nitro-phenyl-3H-4-quinazolone.

EXAMPLE 32

Using a procedure analogous to that described in Example 1, 2,7-dimethyl-3-(o-methoxy-p-amino-phenyl)-3H-4-quinazolone, M.P. 242–243° C., was prepared by catalytic hydrogenation of 2,7-dimethyl-3-(o-methoxy-p-nitro-phenyl)-3H-4-quinazolone.

EXAMPLE 33

Using a procedure analogous to that described in Example 1, 2,7-dimethyl-3-(o-methoxy-m'-amino-phenyl)-3H-4-quinazolone, M.P. 212–214° C., was prepared by catalytic hydrogenation of 2,7-dimethyl-3-(o-methoxy-m'-nitro-phenyl)-3H-4-quinazolone.

EXAMPLE 34

Using a procedure analogous to that described in Example 1,2-methyl-3-(o-methyl-p-amino-phenyl) - 6-methoxy-3H-4-quinazolone, M.P. 214–216° C., of the formula

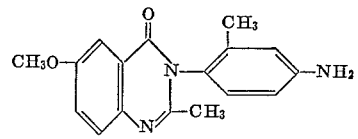

was prepared by catalytic hydrogenation of 2-methyl-3-(o-methyl-p-nitro-phenyl)-6-methoxy-3H-4-quinazolone.

EXAMPLE 35

Using a procedure analogous to that described in Example 1, 2-methyl-3-(o-methyl-p-amino-phenyl)-5,6,7,8-tetrachloro-3H-4-quinazolone, M.P. 290–291° C., of the formula

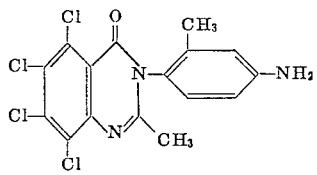

was prepared by catalytic hydrogenation of 2-methyl-3-(o-methyl-p-nitro-phenyl)-5,6,7,8 - tetrachloro-3H-4-quinazolone.

EXAMPLE 36

Using a procedure analogous to that described in Example 1, 2-methyl-3-(o-methyl-p-amino-phenyl)-5-chloro-6-bromo-3H-4-quinazolone of the formula

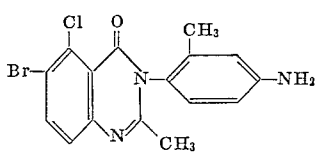

was prepared by catalytic hydrogenation of 2-methyl-3-(o-methyl-p-amino-phenyl)-5-chloro-6-bromo-3H - 4-quinazolone.

EXAMPLE 37

Using a procedure analogous to that described in Example 1, 2,5-dimethyl-3-(o-methyl-p-amino-phenyl)-3H-4-quinazolone of the formula

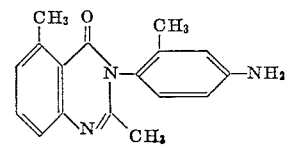

was prepared by catalytic hydrogenation of 2,5-dimethyl-3-(o-methyl-p-nitro-phenyl)-3H-4-quinazolone.

EXAMPLE 38

Using a procedure analogous to that described in Example 1, 2,8-dimethyl-3-(o-methyl-p-amino-phenyl)-3H-4-quinazolone of the formula

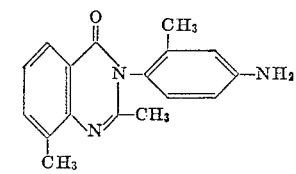

was prepared by catalytic hydrogenation of 2,8-dimethyl-3-(o-methyl-p-nitro-phenyl)-3H-4-quinazolone.

EXAMPLE 39

Using a procedure analogous to that described in Example 1, 2-methyl-3-(o-methyl-p-amino-phenyl)-6,7-dichloro-3H-4-quinazolone, M.P. 264–266° C., was prepared by catalytic hydrogenation of 2-methyl-3-(o-methyl-p-nitro-phenyl)-6,7-dichloro-3H-4-quinazolone.

The compounds according to the present invention, that is, those embraced by Formula I above and their nontoxic, pharmacologically acceptable acid addition salts, have useful pharmacodynamic properties. More particularly, they exhibit very pronounced sedative and anticonvulsive activities, coupled with very low toxicity, in warm-blooded animals.

Thus, the compounds of the present invention possess significantly and surprisingly different properties over structurally closely related compounds described in the prior art. For instance, 2-methyl-3-(o-toluyl)-3H-4-quinazolone [Gujral et al., Indian J. Med. Research 43, 637 (1955); 45, 207 (1957)] is known to exhibit central nervous system stimulating properties; and in British Patent 916,139 it is disclosed that 2-methyl-3-(o-toluyl)-6-amino-3H-4-quinazolone exhibits spasmolytic and muscle-relaxant properties, and we have found that it produces distinct central nervous system stimulation.

For pharmaceutical purposes the compounds of the invention are administered to warm-blooded animals perorally or parenterally, preferably perorally, as active ingredients in dosage unit compositions, that is, compositions in dosage unit form consisting essentially of an inert pharmaceutical carrier having uniformly distributed therethrough one dosage unit of the active ingredient, such as tablets, coated pills, suspensions, solutions, suppositories and the like. One dosage unit of the compounds according to the present invention is from 20 to 500 mgm., preferably 100 to 150 mgm.

The following example illustrates a dosage unit composition adapted for peroral administration comprising a compound according to the present invention as an active ingredient. The parts are parts by weight.

EXAMPLE 40

Tablets.—The tablet composition is compounded from the following ingredients:

|  | Parts |
|---|---|
| 2-methyl-3-(o-methyl-p-amino-phenyl)-8-chloro-3H-4-quinazolone | 100.0 |
| Lactose, pulverized | 130.0 |
| Corn starch | 156.0 |
| Colloidal silicic acid | 8.0 |
| Soluble starch | 4.0 |
| Magnesium stearate | 2.0 |
| Total | 400.0 |

Compounding procedure: The individual ingredients are thoroughly admixed with each other, and the mixture is pressed into 400 mgm. tablets pursuant to customary tablet-making procedures. Each tablet contains 100 mgm. of the active ingredient and disintegrates in the stomach in about twenty seconds.

Although the above dosage unit composition example illustrates only one of the compounds of the present invention as an active ingredient, it should be understood that any of the other compounds embraced by Formula I or their non-toxic, pharmacologically acceptable acid addition salts may be substituted as an active ingredient in Example 40. Likewise, the amount of active ingredient may be varied within the limits set forth above. Finally, the amounts and nature of the inert components may be varied to meet particular requirements.

While the present invention has been illustrated with the aid of certain specific embodiments thereof, it will be readily apparent to others skilled in the art that the invention is not limited to these embodiments, and that various changes and modifications may be made without departing from the spirit of the invention or the scope of the appended claims.

We claim:

1. A compound of the formula

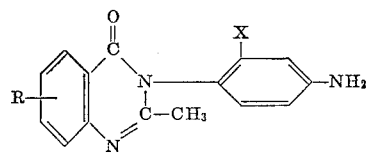

wherein R is selected from the group consisting of bromine and chlorine and X is selected from the group consisting of hydrogen, alkyl of 1 to 3 carbon atoms and alkoxy of 1 to 3 carbon atoms and their non-toxic, pharmaceutically acceptable acid addition salts.

2. A compound of claim 1 wherein X is selected from the group consisting of hydrogen, methyl and methoxy.

3. A compound of claim 1 wherein R is chlorine.

4. A compound of claim 1 wherein the quinazolinone is 2 - methyl - 3 - (o-methyl-p-amino-phenyl) - 8 - chloro-4-(3H)-quinazolinone.

5. A compound of claim 1 wherein the quinazolinone is 2 - methyl - 3 - (o-methoxy-p-amino-phenyl)-8-chloro-4-(3H)-quinazolinone.

References Cited

UNITED STATES PATENTS 3,213,094  10/1965  Morgan et al. _____ 260—256.4 X

OTHER REFERENCES

Bogert et al: J. Am. Chem. Soc., vol. 33 (1911), pp. 949–62.

Gebler: Die Pharmazie, vol. 17, 1962, pp. 616–621.

NICHOLAS S. RIZZO, *Primary Examiner.*

R. J. GALLAGHER, *Assistant Examiner.*

U.S. Cl. X.R.

167—65; 260—244, 251, 254, 256.5, 471